United States Patent
Said et al.

(10) Patent No.: US 9,800,689 B2
(45) Date of Patent: Oct. 24, 2017

(54) DISTRIBUTED APPLICATION INTEGRATION AUTO-ADJUSTMENT

(71) Applicants: Bare Said, Sankt Leon (DE); Peter Eberlein, Malsch (DE)

(72) Inventors: Bare Said, Sankt Leon (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 96 days.

(21) Appl. No.: 14/133,649

(22) Filed: Dec. 19, 2013

(65) Prior Publication Data

US 2015/0180729 A1   Jun. 25, 2015

(51) Int. Cl.
H04L 29/08   (2006.01)
G06F 9/50   (2006.01)

(52) U.S. Cl.
CPC ............ *H04L 67/34* (2013.01); *G06F 9/5066* (2013.01); *H04L 67/18* (2013.01); *H04L 67/10* (2013.01)

(58) Field of Classification Search
CPC ....................................................... H04L 41/20
USPC ....................................................... 709/220
See application file for complete search history.

(56) References Cited

U.S. PATENT DOCUMENTS

| | | | |
|---|---|---|---|
| 8,056,091 B2 | 11/2011 | Brunswig et al. | |
| 8,326,807 B2 | 12/2012 | Aiyer et al. | |
| 8,375,130 B2 | 2/2013 | Eberlein et al. | |
| 8,452,862 B2 | 5/2013 | Neuse et al. | |
| 8,572,156 B2 | 10/2013 | Kruempelmann et al. | |
| 8,612,284 B1 | 12/2013 | Sharif et al. | |
| 8,725,836 B2 | 5/2014 | Lowery et al. | |
| 8,751,573 B2 | 6/2014 | Said et al. | |
| 8,775,462 B2 | 7/2014 | Coldicott et al. | |
| 8,805,989 B2 | 8/2014 | Hemachandran et al. | |
| 2003/0074474 A1* | 4/2003 | Roach et al. | 709/246 |
| 2010/0076933 A1 | 3/2010 | Hamilton et al. | |
| 2011/0126168 A1 | 5/2011 | Ilyayev | |
| 2011/0276537 A1 | 11/2011 | Jegerlehner et al. | |
| 2012/0131101 A1 | 5/2012 | Said et al. | |
| 2012/0259901 A1 | 10/2012 | Lee et al. | |
| 2013/0191531 A1* | 7/2013 | Kruglick | 709/224 |
| 2014/0005979 A1 | 1/2014 | Rao et al. | |
| 2014/0258155 A1* | 9/2014 | Suryanarayanan | H04L 63/10 705/318 |

OTHER PUBLICATIONS

Data Center Map ApS; Data Center Map; Accessed on Dec. 18, 2013; Data Center Map ApS, Ribe, Denmark; (http://www.datacentermap.com/).

* cited by examiner

*Primary Examiner* — Vivek Srivastava
*Assistant Examiner* — Sibte Bukhari

(57) ABSTRACT

A framework for integration auto-adjustment of distributed applications running within the same data center or across different data centers is described. Based on the deployed applications and the locations of the data centers in which they are running, the framework identifies and applies the best application integration variant that provides best user experience.

15 Claims, 5 Drawing Sheets

DISTRIBUTED APPLICATION INTEGRATION AUTO-ADJUSTMENT

BACKGROUND

Software as a service (SaaS), also referred to as "on-demand software" is a software delivery model, in which software and associated data are centrally hosted on the cloud. SaaS is typically accessed by customers using a thin client via a web browser. SaaS has become a common delivery model for many enterprise applications and has been incorporated into the strategy of all leading enterprise software companies.

Globally acting SaaS providers run different data centers spread over several geographic locations. Data centers are usually product or enterprise application oriented and not customer location oriented. This means the same customer can be served by different data centers in case the customer is subscribed to different on-demand enterprise applications or even in case the customer is subscribed to an on-demand solution composed of different on-demand applications that run in different data centers.

An on-demand enterprise solution composed of different on-demand enterprise applications that are running in different data centers may have integration challenges related to the virtual geographic distance between the different data centers and the associated data latency. It would be advantageous to optimize integration between the involved on-demand applications, it would be advantageous to lower the total cost of development by enabling developers to deploy an application without having to be concerned about the physical location of the on-demand components of the application.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for distributed application adaptation auto-adjustment are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one of more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
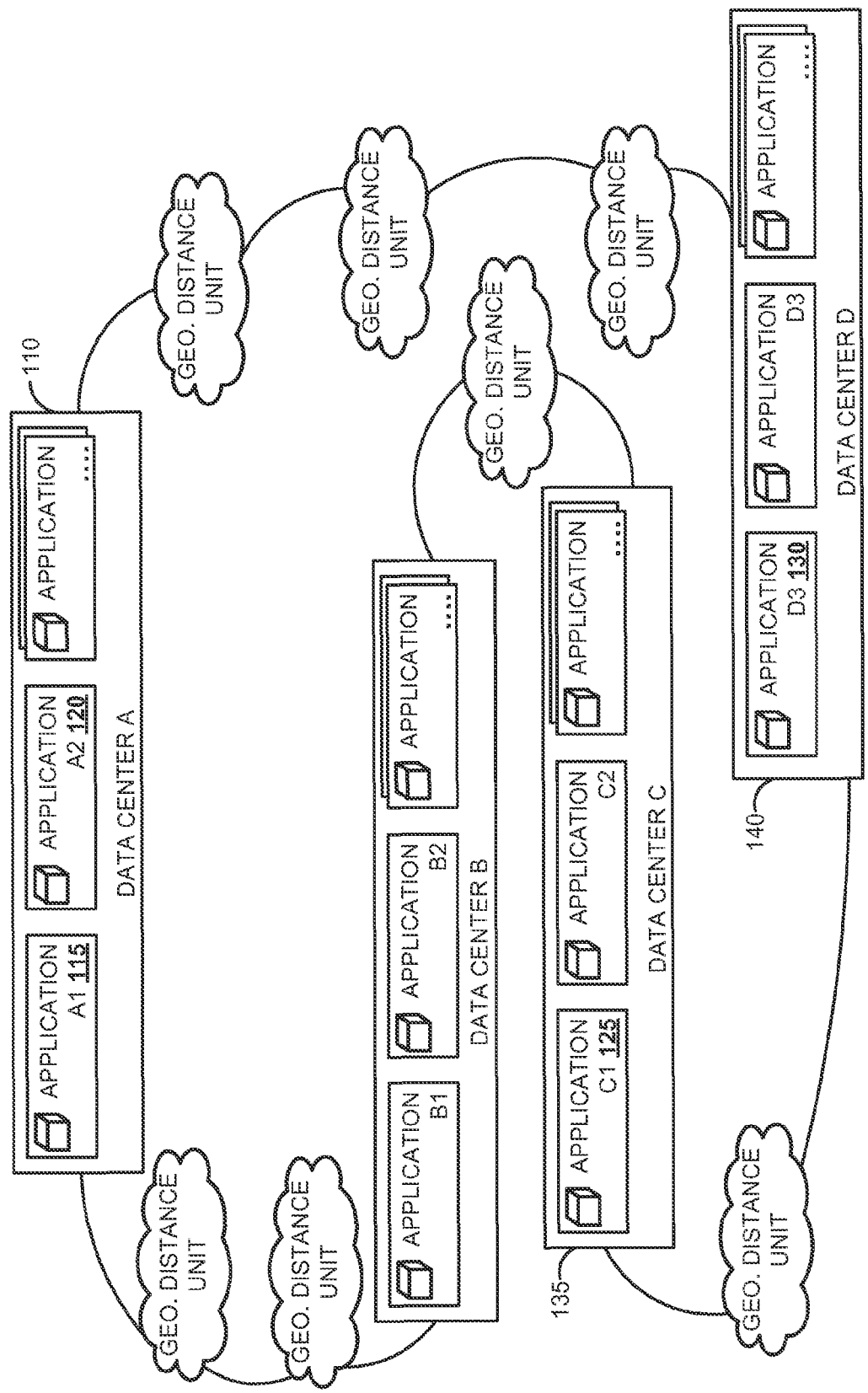
FIG. 1 is a block diagram illustrating an architecture overview of on-demand applications spread over data centers with different locations and geographic distance.

In the cloud, the software applications are rarely stand-alone applications. In fact, typically there are several applications within an on-demand software product including, for example, Application 115 and Application 120 within Data Center 110 in FIG. 1. More often, referring again at FIG. 1, one application is hosted in one data center, for example, Application 125 within Data Center 135 and another application is hosted in a different data center, for example Application 130 within Data Center 140. This requires software product integration within one data center for the applications hosted at one and the same data center, as well as integration across data centers for applications hosted al several data centers in different locations.

Sometimes the physical distance between data centers, hosting applications part of a software product, may be extremely large. This is, for example, the distance between Data Center 110 and Data Center 140 in FIG. 1. In such case data latency may become very noticeable. Data latency is a measure of time delay that describes how long it takes for a packet of data to move from one designated point to another in a given system. The data latency is associated with the physical distance between the data centers. This distance may also be referred to as virtual geo-distance or the geographical distance between the remote data centers. There is a necessity for adaptations diminishing this effect, because the response time due to large virtual geo-distance between data centers may cause performance issues for a user of the application.

A calculation about the location (within which data center) an application is going to be deployed may not be pre-calculated, because of the huge number of applications and also several options for the deployment, concerning the relevant data centers.

Figure 2:
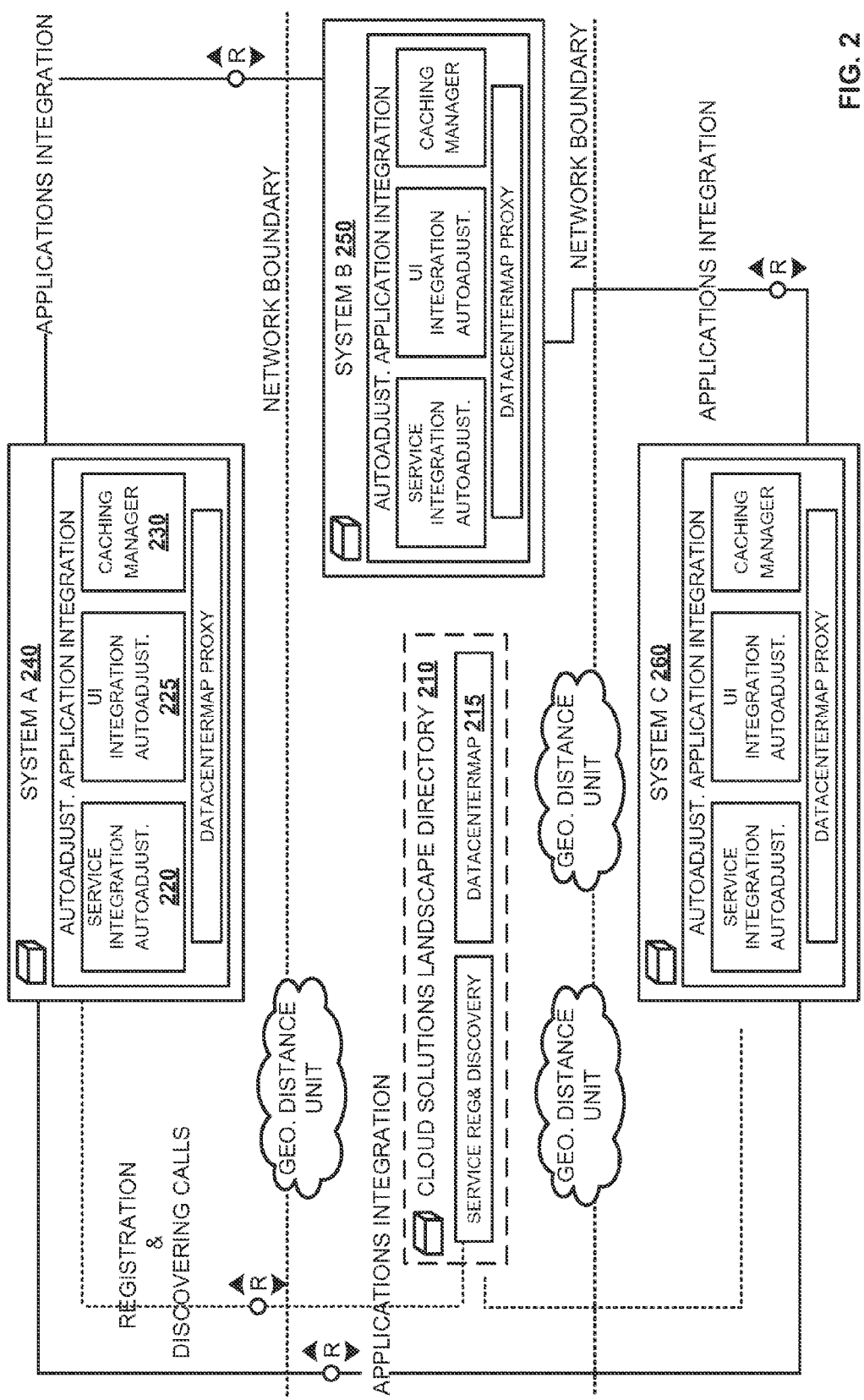
FIG. 2 is a block diagram illustrating an embodiment of an architecture overview for distributed application integration auto-adjustment based on data center map.

FIG. 2 is a block diagram illustrating an embodiment of an architecture overview for distributed application integration auto-adjustment based on data center map. The on-demand system landscape is enriched with metadata that comprises a data center map 215. A global data center map 215 is a depository of information about a deployed software product with its applications and the relevant data center as well as the distance between the data centers. The software product may have additional metadata that is information for the integration between the applications. This is a specific instance of the deployment and when the integration for the software product is performed, the best integration approach for the software product may be chosen. For example, two applications may run in the same data center or in two different data centers that are located far from each other, which would cause data latency and result in a poor user experience. In this scenario, two integration variants may be offered, one that considers deployment within one data center and the second, which considers deployment within the two different data centers.

The data center map 215 contains information about the locality of data centers and their distances to each other. The distances between data centers may be measured in logical units, which correlate to different categories of data latency. For example a logical unit may correspond to certain time delay when data is transferred between two locations.

In one embodiment, when the distance or logical unit between two data centers is zero, the logical unit indicates that it takes less than 100 milliseconds to transfer 100 kilobytes of data. In one embodiment, when the distance or logical unit between two data centers is one, the logical unit indicates that it takes between 100 and 200 milliseconds to transfer 100 kilobytes. When the distance or logical unit between two data centers is two, the logical unit indicates it takes between 200 and 400 milliseconds to transfer 100 kilobytes. When the distance or logical unit between two data centers is three, the logical unit indicates it takes more than 400 milliseconds to transfer 100 kilobytes.

The logical units provide flexibility in the calculation of the data center map. The calculated result is impacted by latency and throughput. In the above example, the data center map uses measure packets based on 100 kilobytes since this is a typical packet size, however other sizes may be used depending on the implementation.

Based on the data center map and deployed applications or components, a predefined integration between the applications may be automatically adjusted to provide best end user experience. The automatic adjustment ensures that the composed software solution behaves as a single product with no interruption or long response time during end user interaction even if the applications are deployed in different data centers.

The auto adjustment may take place, for example, in the following three domains: backend services, user interface, and data caching.

Backend services: service based integration 220 can be implemented via synchronous and/or asynchronous services. Asynchronous services take place outside real time, while synchronous services are real time services, in case of application integration across data centers with long virtual geo-distance, integration via synchronous services may result in long latencies. Fine granular service calls may be avoided and replaced via coarse granular services. Both approaches reduce the number of necessary service calls needed to invoke services located in data center with long virtual geo-distance during an end user session. For each synchronous service that is part of a predefined application integration scenario, an asynchronous variant may be available. Also, for each predefined choreography and set of fine granular services, an alternative coarse granular service may be provided. Depending on data center map 215, optimized application integration may be automatically set up to provide best achievable system behavior from the end user's perspective. Service discovery may also be optimized by ranking the service depending on virtual geo-distance provided in the data center map 215.

User interface integration 225: user interface (UI) elements and UI behavior may be automatically adjusted to the deployment situation and data center map 215 in order to ensure the best user experience. UI features like backend-based auto-completion or auto-validation may be automatically deactivated in order to avoid blocking user entry due to service call latency. Instead, UI elements for explicit validation triggering may be automatically offered, such as push button and menu entry. UI tiles or widgets used in a mash up UI and bound to services provided by a data center with very long virtual geo-distance may also be considered as sources of optimization in case they contain no better than related information to the main data and main context. Such UI tiles/widgets may be removed and replaced by navigation links, so that the end user may get the information on an explicit request if the user is interested in. Also, session behavior may be accurately adapted such as setting generically the best-fit save mode for a UI. In case of long virtual geo-distance, a save and exit UI mode may be more adequate than save and continue mode.

Data caching 230: static data retrieved during service calls may be cached in the target system to avoid data latency and associated long response time. Code lists (e.g. region, currency code) may be good candidates as they are static and not session dependent. In case of application integration across data centers with long virtual geo-distance, code lists may be retrieved once and cached on the target system. In this case, code list services will not be invoked each time when the end user pushes a drop down list box but only once in the session. Also, a pre-retrieval of the code lists can be done during session initialization so that code lists or relevant static data may be made available in the target data center in advance. However, extensive caching may influence system resources negatively. Therefore, a dynamic data caching decision may offer the best ratio between response time optimization and resource consumption.

In one embodiment, the data center map 215 is a collection of tables containing information about the virtual geo-distance between applications needed to be integrated with each other in order to build a holistic software solution. The information in Table 1 may be partially maintained as master data and may be partially derived. Table 1 below contains master data about existing data centers and anti the virtual geo-distance between them.

TABLE 1

| DATA CENTER | DATA CENTER | Virtual GEO-DISTANCE |
|---|---|---|
| A | B | 2 units |
| A | D | 3 units |
| B | C | 1 unit |
| . . . | . . . | . . . |

Table 2 below contains deployment related information. This information is about applications deployed per customer and per data center.

TABLE 2

| DATA CENTER | CUSTOMER | DEPLOYED APPLICATION |
|---|---|---|
| A | Heating Inc. | Sales on Demand |
| A | Heating Inc. | ByDesign Suite |
| B | Heating Inc. | Travel On Demand |
| . . . | . . . | . . . |

Table 3 may be derived via data center map calculator. The calculator may be triggered automatically in an after deployment phase. Based on the data maintained in Table 1 and Table 2, the map calculator derives the virtual geo-distance between the deployed applications as shown in Table 3.

TABLE 3

| Integrated Applications | CUSTOMER | Virtual GEO-DISTANCE |
|---|---|---|
| Sales on Demand/Travel on Demand | Heating Inc. | 2 units |
| Sales on Demand | Heating Inc. | 0 units |
| . . . | . . . | . . . |

The data center map may be defined and derived once in a designated system in the system landscape. The designated system maybe a cloud landscape directory 210 or another system having this role. The data center map may be then replicated in a push approach to other related systems A 240, B 250, C 260 in the different data centers or exposed as a service that can be invoked from other systems in the same or in different data centers.

In one embodiment, the service integration auto adjustment component 220 is responsible for guiding and executing the best integration approach based on the data retrieved in the data center map 215. In order to achieve this, a new metadata model for application integration may be introduced. The metadata model references the relevant services and their different variants that may be used in a pre-defined application integration scenario. Services variations may depend on communication method such as synchronous or asynchronous services or depending on service granularity such as CRUD (Create, Read, Update, Delete) or compound services.

The metadata model may enable the defining of different application integration variants by defining corresponding associations between service variants. The associations may link CRUD services to their compound services and synchronous services with their asynchronous variants.

For application integration over long virtual geo-distance, coarse granular as well as asynchronous services may be favored. For integration within same data center or over small virtual geo-distance, synchronous as well as fine-granular services may be favored, because they enable the system to provide a better user experience.

In case of out of the box integration deployment, the auto-adjust component may read the data center map 215 and may run appropriate application integration variants for integration application scenarios. Also, in case manual integration configuration is needed, the auto adjustment component may facilitate the configuration by guiding the system administrator to use the right service variants. Based on the data center map, the auto adjustment component may influence the discovery and expositions of services. Synchronous services may be kept hidden and only their associated asynchronous variants may be made visible for the administrator in case the integration goes over long virtual geo-distance.

Composed User Interface for distributed applications may use service-based communication to communicate with different backend systems in order to retrieve or modify data. A composition UI metadata model may be enhanced to reference the application integration metadata model. Based on the available data center map and the referenced application integration model, the UI model may be automatically adapted to offer the best user experience.

The appropriate service variants may be bound to the UI elements at deployment time. UI elements may also be switched on or off in accordance with bounded service variants and in accordance with the derived user interface behavior that fits best to the data center map. A generic implementation of the UI auto adjustment may be possible by extending the UI metadata model and corresponding UI runtime engine to react adequately on the available application integration model and data center map.

Development platforms may offer caching mechanisms for the different runtime engines that cover different domains, such as user interface, business object or web service. These caching mechanisms may be enhanced in order to provide a meaningful data caching strategy based on data center map.

Caching mechanism of the UI runtime engine may be enhanced to leverage the information available in data center map and in the application integration model in order to build the UI cache. An application service that is tagged in the application integration model as static read-only data-service may be considered as a candidate for preload and caching. The UI runtime engine may invoke static data services and cache the retrieved data locally in case that these services are located in data center with long virtual geo-distance and in case they are bound to UI elements of the UI model. The retrieved data will be instantly available and with zero-latency, when a user initiated process needs this data. The good response time made possible via such caching mechanism may lead to better user experience although distributed application are integrated over different data centers with long virtual geo-distance.

Figure 3:
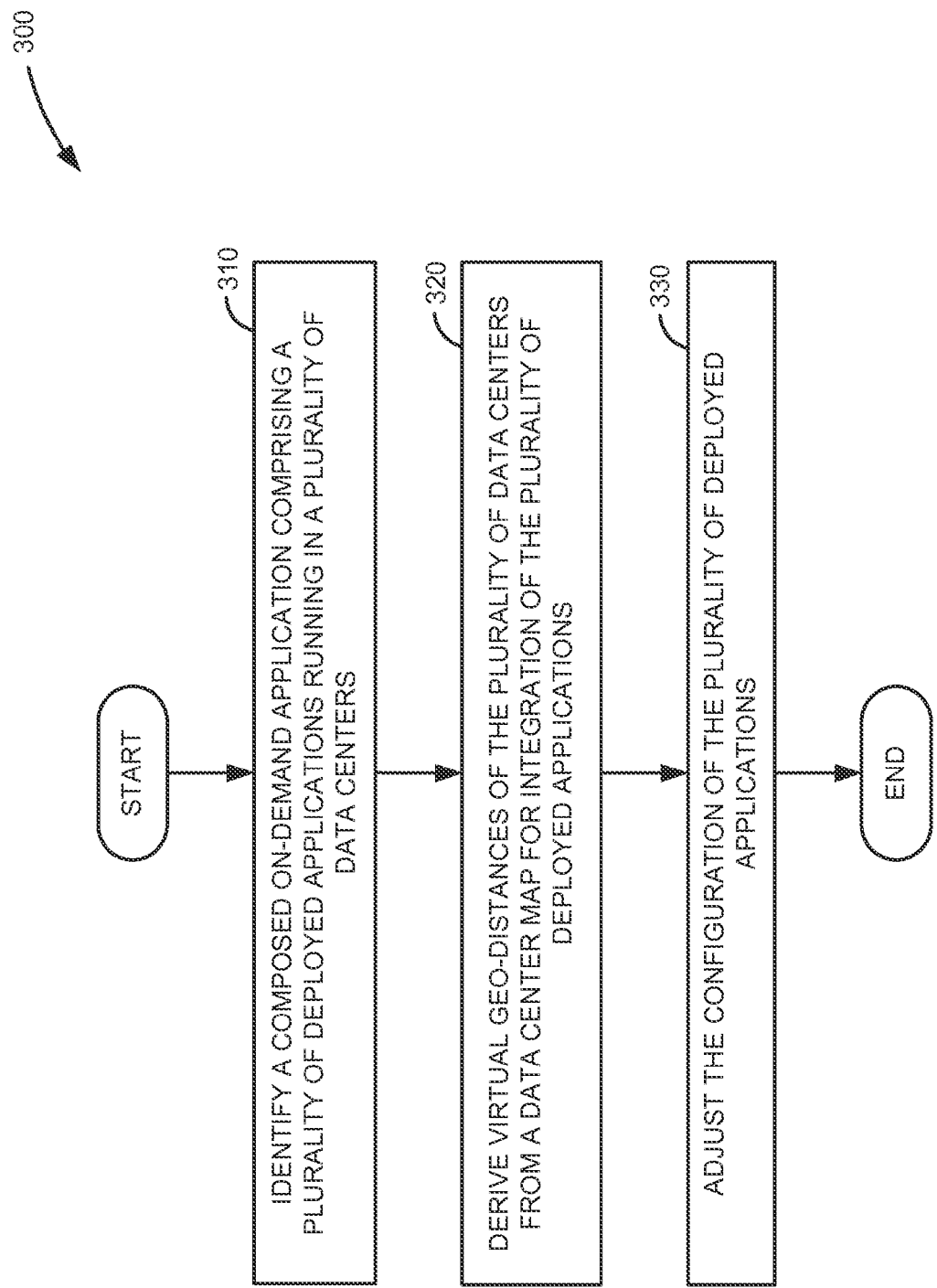
FIG. 3 is a flow diagram illustrating an embodiment of a method for distributed application adaptation auto-adjustment.

FIG. 3 is a flow diagram illustrating an embodiment of a method for distributed application adaptation auto-adjustment. At 310, a composed on-demand application for a user is identified. The composed on-demand application includes a plurality of deployed applications running in a plurality of data centers. In some embodiments, at least two of the plurality of data centers are located in different physical locations. The distance between the data centers may cause data latency. Appropriate integration of the deployed applications as parts of the composed on-demand application may be identified based on the data latency.

At 320, the virtual geo-distances of the data centers are derived from a data center map. In one embodiment, the deriving includes identifying the plurality of deployed applications for a user, identifying the data centers hosting the plurality of deployed applications, and deriving the virtual geo-distances between the data centers of the plurality of deployed applications.

In some embodiments, the virtual geo-distances between the data center are categorized into different types. In one embodiment, when the deployed application are within the same or neighboring data centers equal to zero logical units, the virtual geo-distance between the data centers is given a first categorization or label. In such case the data latency may be neglected. In one embodiment, when the data centers containing the deployed applications are at least one logical unit away from each other, the virtual geo-distance between the data centers is given a second characterization.

At block 330, based on the derived virtual geo-distance, the configuration of the plurality of deployed applications is adjusted. In one embodiment, adjusting the configuration of the plurality of deployed applications includes substituting asynchronous services with synchronous services and substituting coarse granular services with fine granular service, when the first characterization is identified. In one embodiment, adjusting the configuration of the plurality of deployed applications includes substituting synchronous services with asynchronous services and substituting fine granular service with coarse granular services, when the second characterization is identified. In one embodiment, adjusting the configuration of the plurality of deployed applications includes substituting backend based auto-validation and auto-completion services with user interface (UI) elements for validation, and substituting UI widgets in a mash up UI with navigation links on request, when the second characterization is identified. In one embodiment, adjusting the configuration of the plurality of deployed applications includes caching static data retrieved via service calls and pre-retrieving of code lists during session initialization, when the second characterization of the virtual geo-distance is identified between the data centers.

Figure 4:
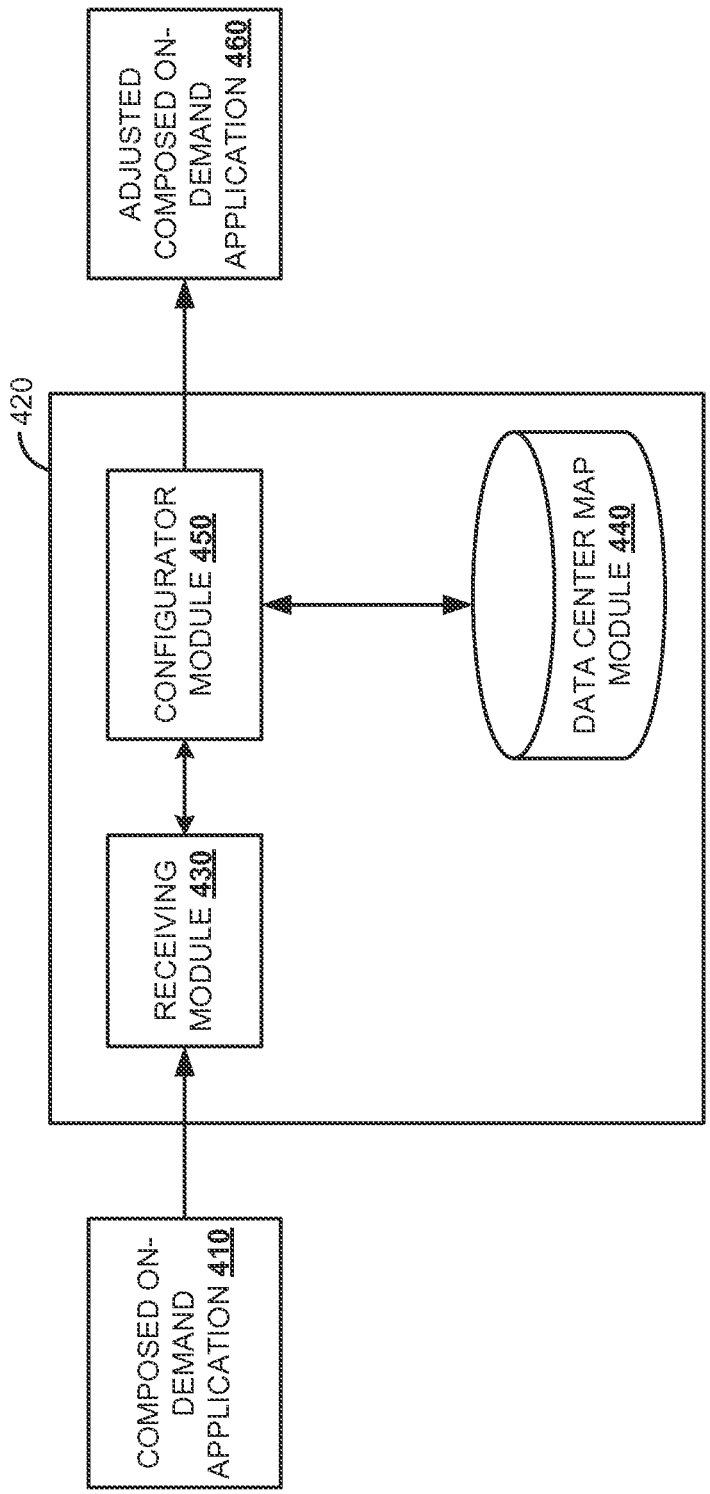
FIG. 4 is a block diagram illustrating an embodiment of a system for distributed application adaptation auto-adjustment.

FIG. 4 is a block diagram illustrating an embodiment of a system 420 for distributed application adaptation auto-adjustment. The system 420 includes a receiving module 430, a data center map module 440, and a configurator module 450.

The receiving module 430 is operable to identify a composed on-demand application 410 for a user. The composed on-demand application 410 includes a plurality of deployed applications running in a plurality of data centers.

The data center map module 440 is operable to persist virtual geo-distance data for the data centers hosting the plurality of deployed applications part of the composed on-demand application 410.

The configurator module 450 is operable to derive virtual geo-distances of the data centers from the data center map module 440 for integration of the plurality of deployed applications and adjust the configuration of the plurality of deployed applications based on the derived virtual geo-distance data, thus creating an adjusted on-demand application 460.

In one embodiment, the configurator module 450 is further operable to identify the plurality of deployed applications for the user from the receiving module 430, identify the data centers hosting the plurality of deployed applications from the data center map module 440, and derive the virtual geo-distances between the data centers of the plurality of deployed applications.

In one embodiment, the configurator module 450 is further operable to determine a first characterization of the virtual geo-distance, if the deployed applications are within the same or neighboring data centers and a second characterization of the virtual geo-distance, if the distance between the data centers is at least one logical unit, wherein the at least one logical unit correlates with data latency.

In one embodiment, the configurator module 450 is further operable to substitute asynchronous services with synchronous services and substituting coarse granular services with fine granular service, when the first characterization is identified. In one embodiment, the configurator module 450 is further operable to substitute synchronous services with asynchronous services and substitute fine granular service with coarse granular services when the second characterization is identified for the virtual geo-distance between the data centers.

In one embodiment, the configurator module 450 is further operable to substitute backend based auto-validation and auto-completion services with user interface (UI) elements for validation, and substitute UI widgets in a mash up UI with navigation links on request, when the second characterization is identified for the virtual geo-distance between the data centers.

In one embodiment, the configurator module 450 is further operable to cache static data retrieved via service calls and pre-retrieve code lists during session initialization, when the second characterization is identified for the virtual geo-distance between the data centers.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is located remotely from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
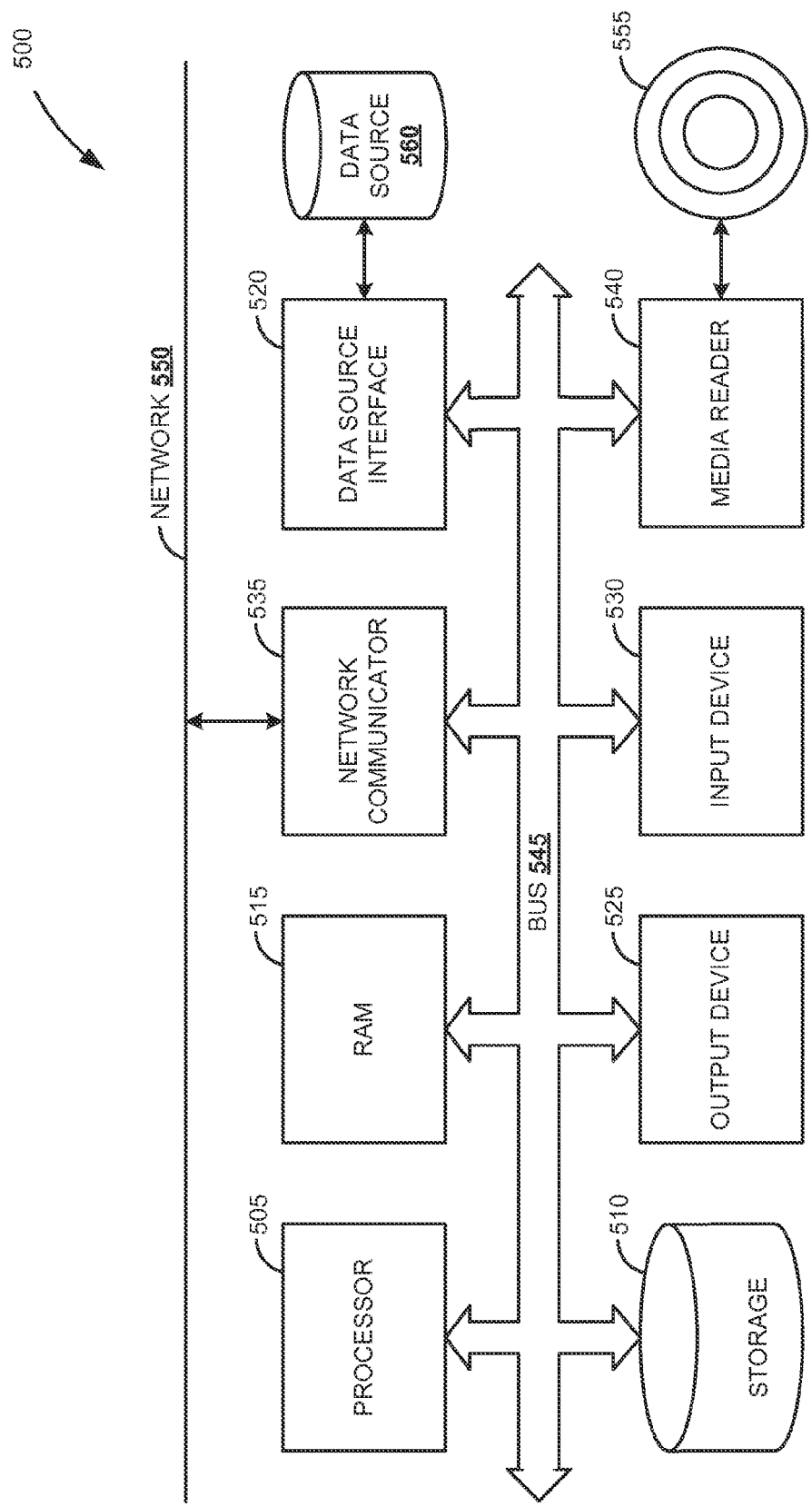
FIG. 5 is a block diagram illustrating an embodiment of a computing environment in which the techniques described for distributed application adaptation auto-adjustment can be implemented.

FIG. 5 is a block diagram of an exemplary computer system 500. The computer system 500 includes a processor 505 that executes software instructions or code stored on a computer readable storage medium 555 to perform the above-illustrated methods. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to adjust integration of composed applications of distributed components, the method comprising:
    identifying a composed on-demand application for a user, the composed on-demand application comprising a plurality of application components deployed on a plurality of data centers;
    deriving, using a processor, virtual geo-distances between the plurality of application components based on physical locations of the plurality of data centers, wherein the virtual geo-distances between the plurality of application components are indicative for corresponding data latency associated with distances between the physical locations of the plurality of data centers; and
    based on the derived virtual geo-distances, automatically adjusting configuration of the plurality of application components to optimize behavior of the composed on-demand application according to the corresponding data latency, wherein the automatic adjustment of the configuration comprising:
        influencing discovery and exposition of services at the composed on-demand application, based on the derived virtual geo-distances between the plurality of application components.

2. The method of claim 1, wherein deriving the virtual geo-distances between the plurality of application components comprises:
    identifying the plurality of data centers hosting the plurality of application components; and
    deriving virtual geo-distances between the plurality of data centers from a data center map, wherein the data center map is metadata comprising tables with information for virtual geo-distances between the plurality of data centers.

3. The method of claim 1, further comprising:
    determining a first characterization, when the derived virtual geo-distances between the plurality of application components indicate that the plurality of application components are deployed on neighboring data centers; and
    determining a second characterization, when the derived virtual geo-distances between the plurality of application components indicate that a virtual geo-distance between data centers of the plurality of data centers is at least one logical unit, wherein the at least one logical unit correlates with the corresponding data latency.

4. The method of claim 3, wherein automatically adjusting the configuration of the plurality of application components comprises at least one operation selected from a group of operations consisting of:
    substituting asynchronous services with synchronous services, when the first characterization is determined;
    substituting coarse granular services with fine granular service, when the first characterization is determined;
    substituting the synchronous services with the asynchronous services, when the second characterization is determined;
    substituting the fine granular services with the coarse granular services, when the second characterization is determined;
    substituting backend based auto-validation and auto-completion services with dedicated user interface (UI) elements for validation, when the second characterization is determined;
    substituting UI widgets in a mash up UI with navigation links on request, when the second characterization is determined;
    caching static data retrieved via service calls, when the second characterization is determined; and
    pre-retrieving code lists during session initialization, when the second characterization is determined.

5. A computer system for distributed application components integration, comprising:
a computer memory to program code: and
a processor to execute the program code to:
identify a composed on-demand application for a user, the composed on-demand application comprising a plurality of application components deployed on a plurality of data centers;
derive virtual geo-distances between the plurality of application components based on physical locations of the plurality of data centers, wherein the virtual geo-distances between the plurality of application components are indicative for corresponding data latency associated with distances between the physical locations of the plurality of data centers; and
automatically adjust, based on the derived virtual geo-distances between the plurality of application components, configuration of the plurality of application components to optimize behavior of the composed on-demand application according to the corresponding data latency, wherein the automatic adjustment of the configuration comprising:
influence discovery and exposition of services at the composed on-demand application, based on the derived virtual geo-distances between the plurality of application components.

6. The system of claim 5, wherein deriving the virtual geo-distances between the plurality of application components comprises:
identify the plurality of data centers hosting the plurality of application components; and
derive virtual geo-distances between the plurality of data centers from a data center map, wherein the data center map comprises tables with information for the virtual geo-distances between the plurality of data centers.

7. The system of claim 5, the processor further executes the program code to:
determine a first characterization, when the derived virtual geo-distances between the plurality of application components indicate that the plurality of application components are deployed on neighboring data centers; and
determine a second characterization, when the derived virtual geo-distances between the plurality of application components indicate that a virtual geo-distance between data centers of the plurality of data centers is at least one logical unit, wherein the at least one logical unit correlates with the corresponding data latency.

8. The system of claim 7, wherein automatically adjusting the configuration of the plurality of application components comprises at least one operation selected from a group of operations consisting of:
substitute asynchronous services with synchronous services, when the first characterization is determined;
substitute coarse granular services with fine granular service, when the first characterization is determined;
substitute the synchronous services with the asynchronous services, when the second characterization is determined; and
substitute the fine granular service with the coarse granular services when the second characterization is determined;
substitute backend based auto-validation and auto-completion services with user interface (UI) elements for validation, when the second characterization is determined;
substitute UI widgets in a mash up UI with navigation links on request, when the second characterization is determined;
cache static retrieved via service calls, when the second characterization is determined; and
pre-retrieve code lists during session initialization, when the second characterization is determined.

9. An article of manufacture including a non-transitory computer readable storage medium to tangibly store instructions, which when executed by a computer, cause the computer to:
identify a composed on-demand application for a user, the composed on-demand application comprising a plurality of application components deployed on a plurality of data centers;
derive virtual geo-distances between the plurality of application components based on physical locations of the plurality of data centers, wherein the virtual geo-distances between the plurality of application components are indicative for corresponding data latency associated with distances between the physical locations of the plurality of data centers; and
based on the derived virtual geo-distances, automatically adjust configuration of the plurality of application components to optimize behavior of the composed on-demand application according to the corresponding data latency, wherein the automatic adjustment of the configuration comprising:
influence discovery and exposition of services at the composed on-demand application, based on the derived virtual geo-distances between the plurality of application components.

10. The article of manufacture of claim 9, wherein deriving the virtual geo-distances between the plurality of application components comprises:
Identify the plurality of data centers hosting the plurality of application components; and
deriving virtual geo-distances between the plurality of data centers from a data center map, wherein the data center map is metadata comprising tables with information for virtual geo-distances between the plurality of data centers.

11. The article of manufacture of claim 9, further comprising instructions, which when executed by the computer, cause the computer to:
determine a first characterization, when the derived virtual geo-distances between the plurality of application components indicate that the plurality of application components are deployed on neighboring data centers; and
determine a second characterization, when the derived virtual geo-distances between the plurality of application components indicate that a virtual geo-distance between data centers of the plurality of data centers is at least one logical unit, wherein the at least one logical unit correlates with the corresponding data latency.

12. The article of manufacture of claim 11, wherein automatically adjusting the configuration of the plurality of application components comprises at least one operation selected from a group of operations consisting of:
substitute asynchronous services with synchronous services, when the first characterization is determined;
substitute coarse granular services with fine granular service, when the first characterization is determined;
substitute the synchronous services with the asynchronous services, when the second characterization is determined;

substitute the fine granular services with the coarse granular services, when the second characterization is determined;

substitute backend based auto-validation and auto-completion services with user interface (UI) elements for validation, when the second characterization is determined;

substitute UI widgets in a mash up UI with navigation links on request, when the second characterization is determined;

cache static retrieved via service calls, when the second characterization is determined; and pre-retrieve code lists during session initialization, when the second characterization is determined.

13. The method of claim 1, wherein influencing the discovery of the services comprises:

ranking the services depending on the derived virtual geo-distances between the plurality of application components, to optimize service based integration of the plurality of application components.

14. The system of claim 5, wherein influencing the discovery of the services comprises:

rank the services depending on the derived virtual geo-distances between the plurality of application components, to optimize service based integration of the plurality of application components.

15. The article of manufacture of claim 9, wherein influencing the discovery of the services comprises:

rank the services depending on the derived virtual geo-distances between the plurality of application components, to optimize service based integration of the plurality of application components.

* * * * *